Dec. 26, 1961     L. L. ARNES     3,014,698
LIFT JACK
Filed Aug. 27, 1956     3 Sheets-Sheet 1
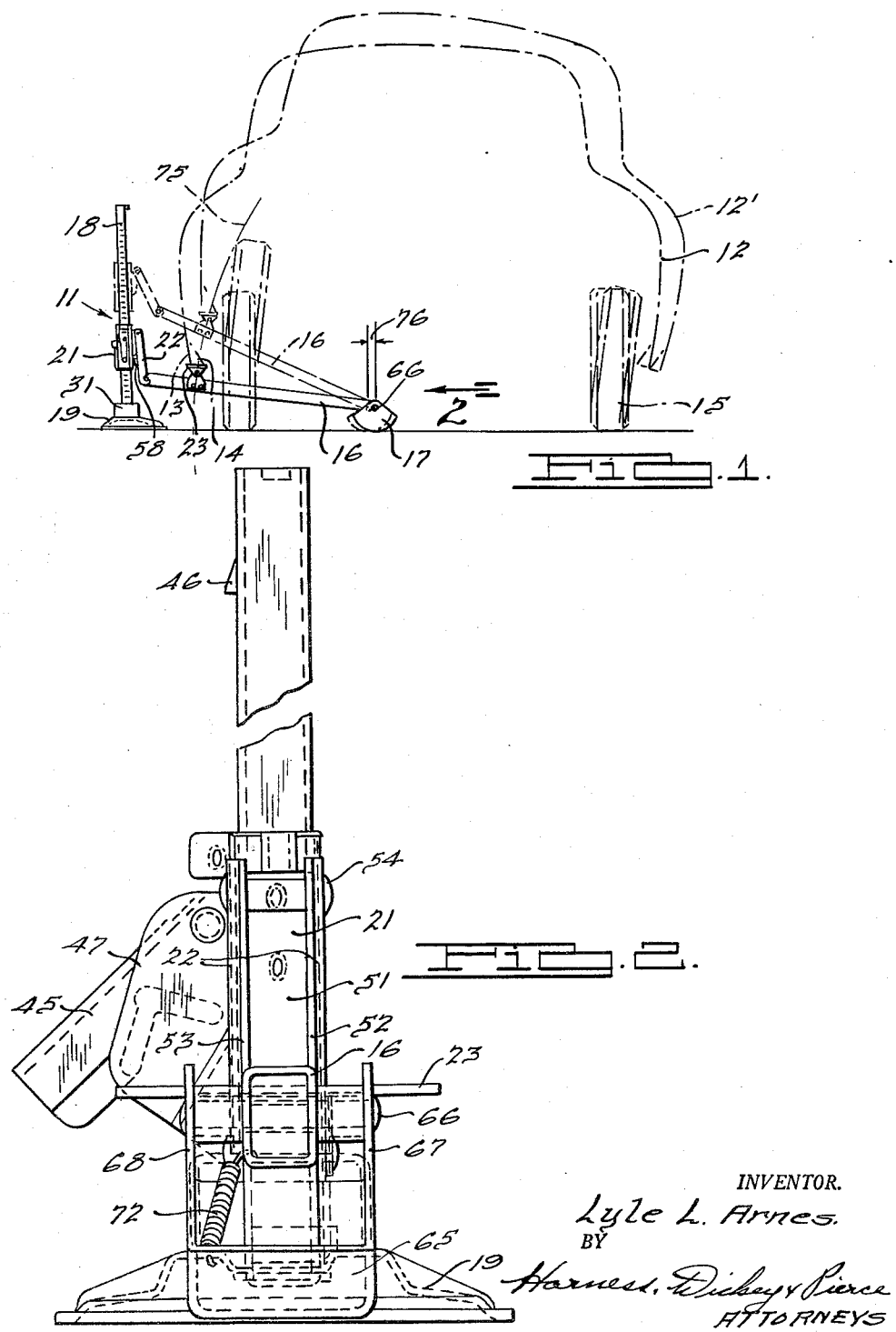
INVENTOR.
Lyle L. Arnes.
BY
Harness, Dickey & Pierce
ATTORNEYS

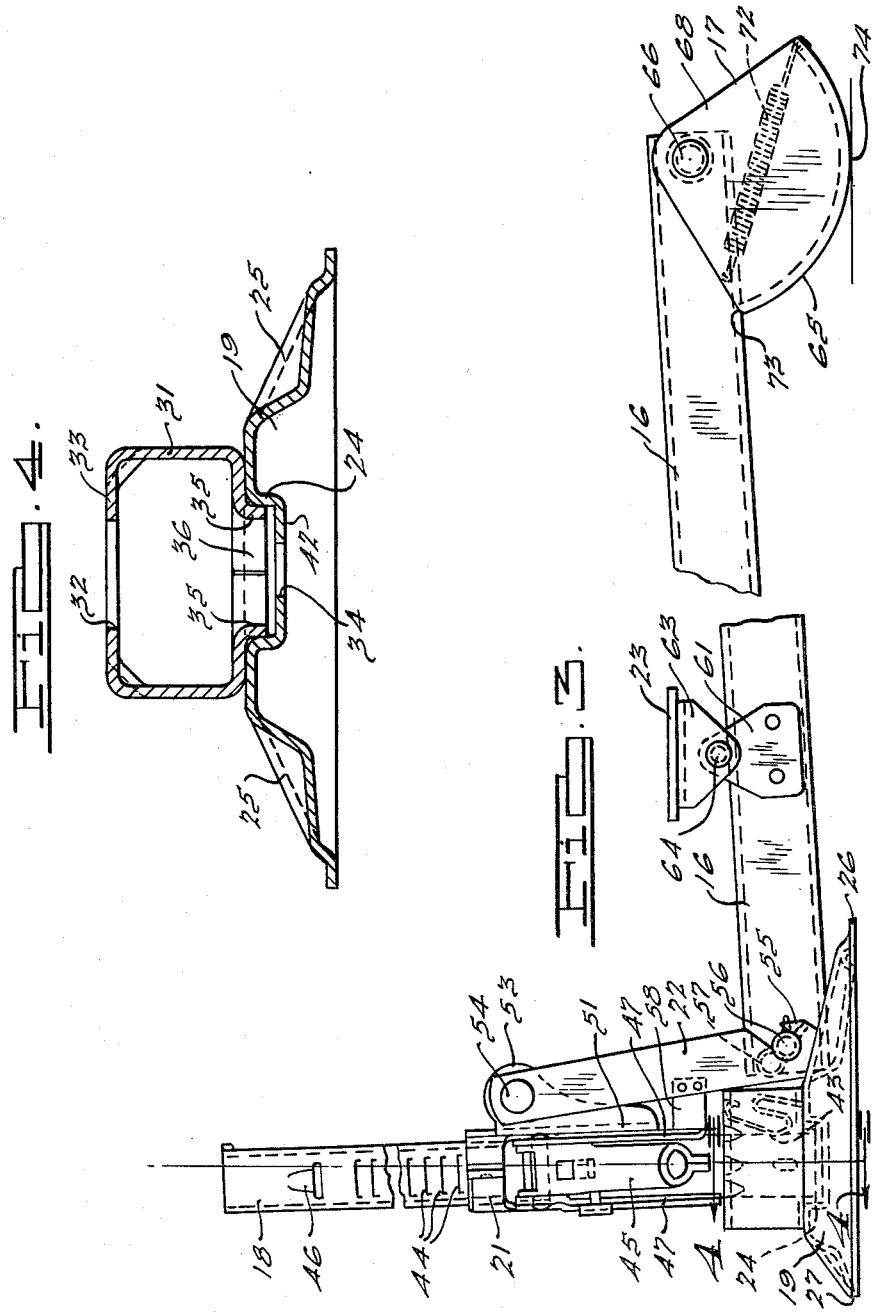

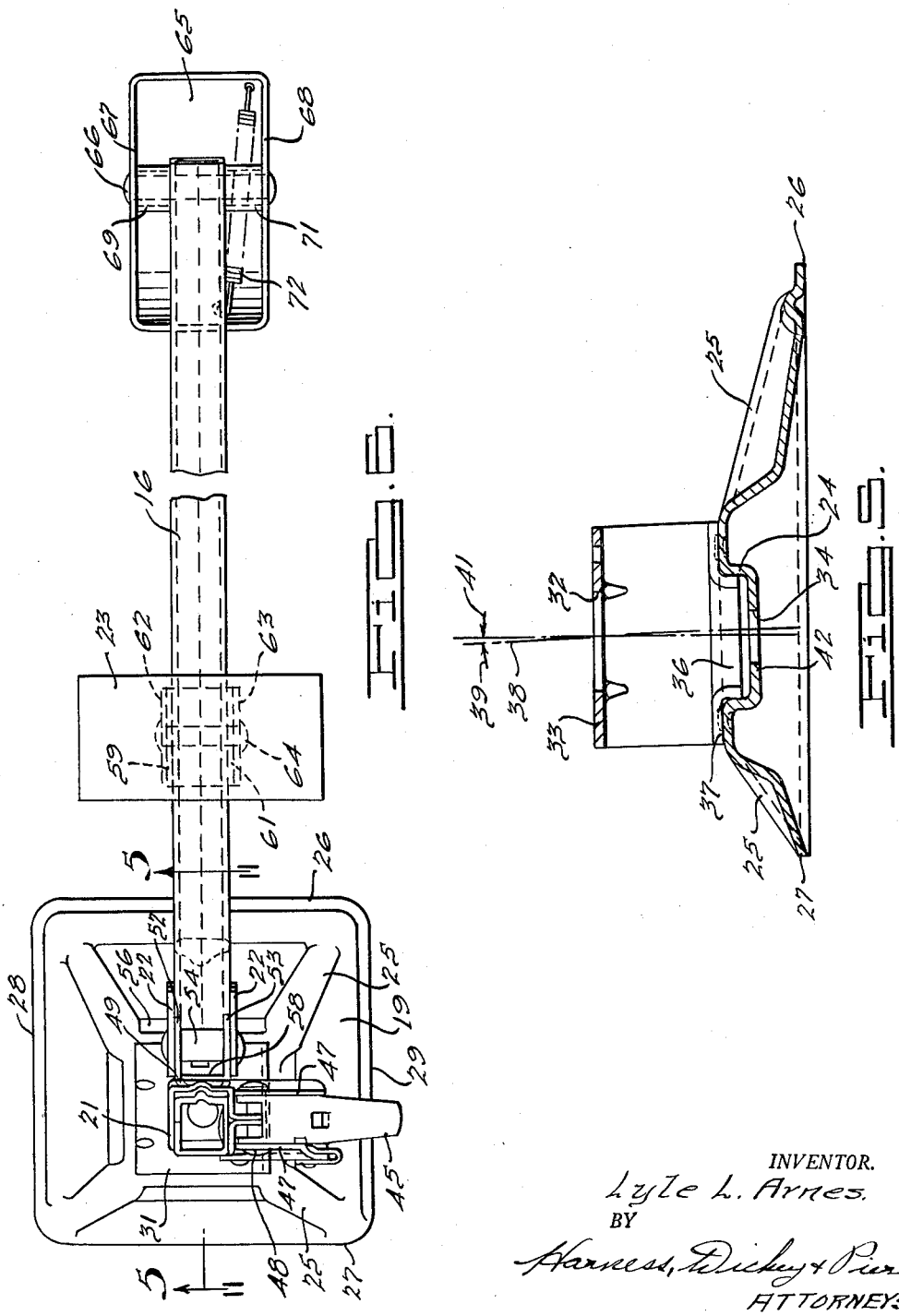

United States Patent Office 3,014,698
Patented Dec. 26, 1961

3,014,698
LIFT JACK
Lyle L. Arnes, Racine, Wis., assignor, by mesne assignments, to Walker Manufacturing Company, Racine, Wis., a corporation of Delaware
Filed Aug. 27, 1956, Ser. No. 606,399
7 Claims. (Cl. 254—124)

This invention relates to lift jacks, and more particularly to jacks intended for use with automotive vehicles and operable from the side of a car to tilt the car upwardly while its other side rests on the ground.

In recent years the design of automotive vehicles, and particularly the bumpers thereof, has made the use of bumper jacks less feasible than on earlier models. The provision of bumpers on modern cars which are of an increasingly ornamental nature has made it more difficult to provide ratchet or hydraulic type jacks which can properly engage the bumper and reliably raise that portion of the vehicle upon which repairs are to be made.

It is an object of the present invention to provide a novel and improved jack for automotive vehicles which can be operated from the side of the vehicle rather than from either end, thus eliminating the need for engagement of a bumper, and which at the same time includes means for insuring that the jack operator will be stationed closely adjacent the side of the vehicle, thus preventing the possibility of his being close to oncoming traffic when repairs are being made at the side of the road.

It is another object to provide an improved vehicle jack of this nature which is engageable with the sheet metal side sill below the vehicle doors, thus eliminating the inconvenience involved in locating the load-engaging portion of the jack beneath the vehicle frame.

It is also an object to provide an improved jack of this character which includes means for insuring that the load-engaging portion of the jack will follow at all times the path of movement of that part of the vehicle which it directly engages, thus avoiding lateral forces which might lessen jack stability.

It is a further object to provide an improved lifting jack of this character which may be operated from a comfortable position alongside the vehicle, and which includes means for preventing the jack operating parts from scratching or otherwise damaging painted vehicle surfaces, despite the fact that the vehicle side may be raised to a relatively high level.

Other objects, features and advantages of the present invention will become apparent from the subsequent description, taken in conjunction with the accompanying drawings.

In the drawings:

FIGURE 1 is an elevational and partially schematic view showing the manner of cooperation of the novel jack with the body of an automotive vehicle, with the jack and vehicle shown in both lowered and raised positions;

FIGURE 2 is an elevational view of the jack, with parts broken away, taken in the direction of the arrow 2 of FIGURE 1 and showing the connection of the links to the jack body as well as the relative disposition of the curved shoe and jack beam;

FIGURE 3 is a side elevational view of the jack, with parts broken away, similar to that of FIGURE 1 but on an enlarged scale, showing the position of the rack bar with respect to the vertical and its position within the base;

FIGURE 4 is a cross-sectional view of the base assembly taken in elevation along the line 4—4 of FIGURE 3 and showing the means for maintaining the rack bar in stationary position;

FIGURE 5 is a cross-sectional view in elevation of the jack base and socket taken along the line 5—5 of FIGURE 6 and showing the inclined mounting of the socket on the base; and FIGURE 6 is a plan view of the jack with parts broken away, showing the configurations of the base, lifting pad and arcuate shoe.

The novel jack is generally indicated at 11 and is shown in FIGURE 1 as being applied to an automotive vehicle shown in outline at 12 in its normal position and at 12' in a raised position. The jack is adapted to be placed under the vehicle from the side so that the load-engaging portion of the jack contacts the car at a lower sheet metal side sill 13, a portion of the vehicle normally reinforced by a plurality of gusset plates 14 or similar members. In consequence, the vehicle when lifted will tilt about an axis passing through the areas of contact of wheels 15 on the side opposite that being lifted.

The main jack elements comprise a beam 16 which extends beneath the vehicle side at right angles thereto when the jack is being used, a shoe 17 at the inner end of beam 16 and engageable with the ground beneath the vehicle, a rack bar 18 mounted in substantially upright position on a base 19 alongside the vehicle, a body 21 movable on rack bar 18, and a pair of links 22 connecting body 21 to the outer end of beam 16. A lifting pad 23 is mounted on an intermediate portion of beam 16 and is engageable with the underside of sill 13, so that elevation of body 21 on rack bar 18 will cause upward tilting of the vehicle from the position indicated at 12 to that indicated at 12' in FIGURE 1, the jack elements during this lifting process being moved from their solid lines to their dot-dash line position in this figure.

Before discussing the detailed movements of the various jack elements which take place during the overall operational sequence described above, it would perhaps be preferable to first describe in more detail the construction of the jack itself. Referring first to base 19, this comprises a plate of generally square configuration as shown in FIGURE 6, having upwardly sloping surfaces shown in FIGURE 5 which extend inwardly toward an indented central portion 24. The base is preferably fabricated from a heavy sheet metal blank stamped or otherwise formed into the proper configuration, and may be provided with a plurality of ribs 25 for strengthening purposes. Base 19 is intended for use in a specified position with respect to the car being lifted, this position being such that edge 26 of the base (hereinafter termed the inner edge) will face the vehicle, with outer edge 27 away from the vehicle and side edges 28 and 29 parallel to the front and rear ends of the vehicle. Indentation 24 is so located with respect to these edges that its distance from inner edge 26 is substantially greater than the distance from outer edge 27; this is best seen in FIGURES 3 and 5. Indentation 24 is however equidistant from side edges 28 and 29 of the base.

Secured to the upper surface of base 19 and disposed above indentation 24 is a socket 31 for the reception of rack bar 18. Socket 31 may be formed from a heavy sheet metal blank formed to a configuration roughly approximating an inverted U, with the lower ends of the U legs further formed to fit within indentation 24. The shape of socket 31 is best seen in FIGURES 4 and 5, and it will be noted from these figures that a central aperture 32 is provided in the upper or central leg 33 of socket 31, with a corresponding but smaller aperture 34 centrally formed in indentation 24 of the base. The lower ends 35 of socket 31 which fit within indentation 24 together form an aperture 36 which is aligned with and of approximately the same size as aperture 32. Both apertures 32 and 36 are of substantially square shape, this shape corresponding to the cross-sectional configuration of the rack bar as later described.

As shown best in FIGURE 5, the base surface 37 to which socket 31 is secured slopes slightly, being lower at the end closest to outer edge 27 than at the end facing inner edge 26. As a result of this slope, apertures 32 and 36 of socket 31 will have a common axis 38 which is slightly inclined with respect to the vertical, as indicated by the spaced arrows 39 and 41 in FIGURE 5. This inclination is such that when rack bar 18 is inserted in apertures 32 and 36, it will be inclined toward base edge 27. The overall construction is therefore such that substantially greater resistance will be presented to moment forces on rack bar 18 in a direction toward base edge 26 than to moment forces in the opposite direction. When in its operative position, rack bar 18 will rest upon a platform 42 which forms the central portion of indentation 24 surrounding aperture 34, and may be retained in position by a spring 43 shown in FIGURE 3.

Rack bar 18, as mentioned above, is of substantially square cross-sectional shape, being of tubular construction and having a plurality of ratchet teeth 44 along one side. These teeth are adapted to cooperate with a pawl mechanism (not shown) carried by body 21 of the jack in such manner that the body may be selectively raised or lowered by manipulation of a setting lever (not shown) mounted on the body. Although various types of lifting and lowering mechanisms may be used within the scope of the invention, a typical construction is that disclosed and claimed in Patent No. 2,730,903, issued January 17, 1956, to Trautman et al. A handle socket 45 is pivotally mounted on body 21 for operating the pawl mechanism by means of a lug wrench (not shown) or similar tool inserted therein for oscillation of the socket. A stop 46 is formed on the upper portion of rack bar 18 for limiting upward movement of body 21.

As stated previously, the novel jack is so constructed that the user may elevate the desired portion of the vehicle while standing immediately adjacent the vehicle side. In the illustrated embodiment, this is accomplished by having handle socket 45 project in a plane parallel to the side of the vehicle being elevated, so that the person manipulating the inserted lug wrench may do so from a position alongside the vehicle. As shown best in FIGURES 1 and 3, rack bar 18, when placed in its operative position on base 19, is so disposed that teeth 44 thereon face in a direction parallel to the side of the vehicle body. The pawl mechanism carried by body 21 of the jack is located so as to be engageable with teeth 44. For this purpose, body 21 may be formed from a sheet metal blank in such manner that at least a portion of the body will surround rack bar 18, with a pair of oppositely disposed flange portions 47 (best visible in FIGURE 6) between which a major portion of the pawl mechanism is disposed, and which carry handle socket 45 pivoted therebetween by means of a pin 48.

On the side 49 of body 21, which side faces the vehicle when the jack is in operative position, a bracket 51 is mounted by welding or other appropriate means. This bracket, which is substantially channel-shaped, has pivoted alongside its legs 52 and 53 the pair of links 22 by means of a pin 54. Links 22 are of identical shape and have hooked lower ends 55, best visible in FIGURE 3, adapted to engage the opposite ends of a pin 56 carried at the outer end of beam 16, in such manner that when links 22 are raised or lowered, the outer end of beam 16 will carry out a like movement. A cotter pin 57 may be provided for holding pin 56 in position. A U-shaped spacer 58, best seen in FIGURE 3, is connected between links 22 at an intermediate portion thereof, the spacer having a central portion which is so inclined as to engage side 49 of body 21, thus limiting the clockwise rotation of links 22 about pin 54, as shown in FIGURE 3. The nature of supporting bracket 51 is such that free simultaneous swinging movement of the links is possible in a counter-clockwise direction from the FIGURE 3 position, as is demonstrated by the raised position of the jack shown in dot-dash lines in FIGURE 1. It should be noted in FIGURE 3 that base 19 of the jack is so formed as to permit maximum downward movement of links 22 and the associated end of beam 16, these parts being disposed in their lower position between two ribs 25 of the base.

Beam 16 is preferably of hollow rectangular cross-sectional shape, being of sufficient strength and rigidity to resist loads to which it will normally be subjected. The length of beam 16 is such that it may extend beneath the car a sufficient distance to provide adequate leverage for the jack elements. As seen best in FIGURES 3 and 6, lifting pad 23 is secured to an intermediate portion of beam 16 by means of a pair of upstanding brackets 59 and 61 on beam 16 which support a pair of ears 62 and 63 by means of a pivot pin 64. Pad 23 rests on ears 62 and 63 and may therefore swing freely with respect to beam 16 so as to maintain firm engagement with sill 13 of the vehicle during jack operation. As will be observed in FIGURE 1, the distance between lifting pad 23 and the inner end of beam 16 is substantially less than the width of a standard size automotive vehicle.

The purpose of arcuate shoe 17 is to permit free lateral movement of the inner end of beam 16 to compensate for the fact that the distance of pad 23 from this end of the beam is less than the width of the vehicle being lifted. Shoe 17 may be formed of a sheet metal plate bent in such manner as to provide an arcuate ground-engaging surface 65 of sufficient width to insure the proper bearing load distribution. The center of curvature of shoe surface 65 is coincident with the axis of a pin 66 extending between a pair of oppositely disposed segmental walls 67 and 68 formed as part of shoe 17. Pin 66 passes through the inner end of beam 16, the beam being spaced equidistantly between walls 67 and 68 by spacers 69 and 71. A tension coil spring 72 is connected at one end to the side of shoe 17 away from beam 16, and at its other end to beam 16. The tension in spring 72 is such that shoe 17 is normally urged in a clockwise direction as shown in FIGURE 3, so that edge 73 of the shoe will engage the underside of the beam. When in this position, the point of contact 74 of shoe 17 with the ground is somewhat to the right of center as shown in FIGURE 3, so that a greater portion of the area of surface 65 is available for rolling to the left, that is, toward the side of the car being lifted.

In operation, the jack will normally be in disassembled condition prior to its use, so that it may readily be stowed in the luggage compartment of the vehicle. When in such disassembled condition, rack bar 18 will be removed from base socket 31, and beam 16 will be disconnected from the hooked ends of links 22. After the jack parts have been removed from the luggage compartment, the operator will grasp beam 16 with both hands, inserting that end of the beam carrying shoe 17 beneath the vehicle at a point adjacent the wheel to be changed but under a portion of the vehicle having a side sill 13 with a flat lower surface. The beam will be so located that lifting pad 23 is underneath sill 13 with the beam at right angles to the longitudinal car axis. The operator will then place base 19 adjacent the outer end of the beam, with edge 26 of the base facing the vehicle. He will then insert the lower end of rack bar 18 in socket 31 of base 19 until the lower end of the rack bar engages surface 42 of base indentation 24. The rack bar will be inserted in socket 31 in such a position that links 22 carried by jack body 21 face beam 16. Body 21 will then be lowered on rack bar 18 a sufficient distance to permit engagement of beam pin 56 with hook-shaped portions 55 of the links.

Jack 11 will now be ready for the lifting operation. As seen in FIGURE 1, when in its initial position spacer 58 attached to links 22 will be in engagement with side 49 of body 21, and shoe 17 will be so disposed relative to beam 16 that edge 73 of the shoe engages the beam. Rack bar 18 will be substantially upright alongside vehicle 12, being slightly inclined away from the vehicle. Due to the disposition of rack bar 18 with respect to base 19, the base will present a substantially greater resistance to moment forces tending to swing rack bar 18 clockwise in FIGURE 1 than to forces tending to swing it counterclockwise.

In order to elevate the vehicle, a lug wrench or other tool handle will be inserted in handle socket 45 and oscillated, raising body 21 on rack bar 18. During this movement, links 22 will be lifted, thus lifting the outer end of beam 16, the latter swinging about pivot 66 at its inner end. Lifting pad 23 will thus raise sill 13 and the adjacent portion of the vehicle.

As the vehicle is lifted, it will tend to swing about an axis located approximately at the areas of engagement with the ground of tires 15 on the other side of the vehicle. This will result in sill 13 following an arcuate path indicated by the line 75 in FIGURE 1. In order to avoid lateral forces on the jack which might lessen its stability, means are provided for insuring that lifting pad 23 will also follow this arcuate path. In the illustrated embodiment, this means includes shoe 17, which, in response to slight frictional forces between sill 13 and lifting pad 23 parallel to their contacting surfaces, will roll to the left in FIGURE 1 as the vehicle is lifted. The reason why leftward movement of shoe 17 is required will be obvious from an examination of this figure. Since the distance between lifting pad 23 and pin 66 is substantially less than the radius of curvature of path 75, restraint of pin 66 would result in lifting pad 23 being displaced rightwardly with respect to sill 13. To compensate for this differential in radii of curvature, the leftward rolling movement of shoe 17 will result in pin 66 being moved leftwardly. In the raised position shown in dot-dash lines in FIGURE 1, a distance 76 marked by arrows will be the movement required of pin 66 in order to insure that the lifting pad and sill will remain in firm engagement. Leftward rolling of shoe 17 will of course be against the urging of spring 72, which however is comparatively weak and will not interfere with the action described above.

During lifting of the vehicle, beam 16 will assume a greater inclination with respect to the horizontal, and links 22 will therefore swing outwardly from body 21, as shown in FIGURE 1, to compensate for this motion. Due to the fact that rack bar 18 remains stationary and that links 22 are spaced from the vehicle side, there will be no portions of the jack which approach the painted surface of the vehicle, and there will thus be no danger of any damage to this surface. The inclined position of links 22 when the vehicle is raised will impart horizontal as well as vertical force components to rack bar 18. Due to the slight inclination of rack bar 18 away from the vehicle body, and the substantially greater portion of base 29 disposed on the side toward the vehicle, these forces will be resisted in such manner as to maintain the stability of the jack and prevent any undesired movement of the vehicle.

In order to lower the vehicle to its normal position, the pawl mechanism is set in its "down" condition and handle socket 45 again oscillated. As beam 16 is lowered, shoe 17 will roll in the opposite direction from its previous movement, and links 22 will swing downwardly into their former position. After lifting pad 23 has been disengaged from sill 13, the jack parts may be disassembled as previously described. It should be observed that during the entire lifting and lowering operation, it is not necessary for the jack operator to leave a position closely adjacent the side of the vehicle. In particular, insertion and withdrawal of beam 16 from beneath the vehicle may be easily accomplished by swinging the beam underneath the vehicle body. Oscillation of handle socket 45 will be carried out with the tool projecting from the socket in a direction parallel with the vehicle, so that the operator may readily grasp the tool while standing adjacent the vehicle side.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a jack for lifting vehicles, a beam adapted for insertion beneath one side of a vehicle, ground-engaging means at the inner end of said beam, load-engaging means at an intermediate portion of said beam, the distance between said ground-engaging means and said load-engaging means being substantially less than the width of a vehicle, means adapted to be supported alongside the vehicle for raising the outer end of said beam, and means providing for movement of the inner end of said beam toward the side of the vehicle being lifted as said side is lifted, whereby said load-engaging means will be free to follow the path of movement of that portion of the vehicle with which it is engaged.

2. In a lifting jack, a beam adapted to be inserted beneath one side of a vehicle, ground-engaging means comprising an arcuate shoe pivoted to the inner end of said beam, load-engaging means carried by an intermediate portion of said beam, and means adapted to be supported alongside the vehicle for raising the outer end of said beam.

3. In a jack for lifting vehicles, a beam adapted to be inserted beneath one side of the vehicle at right angles to the longitudinal axis of the vehicle, an arcuate ground-engaging shoe pivoted at the inner end of said beam, load-engaging means carried by an intermediate portion of said beam, the distance between said load-engaging means and said ground-engaging means being substantially less than the width of a vehicle, and means adapted for disposition alongside the vehicle for raising the outer end of said beam.

4. In a lifting jack, a beam comprising a straight elongated member adapted for insertion underneath one side of a vehicle at right angles to the longitudinal axis of the vehicle, ground-engaging means movably mounted at the inner end of said member, said ground-engaging means providing for movement of said inner end in a direction at right angles to said vehicle longitudinal axis, a lifting pad pivotally mounted on an intermediate portion of said beam and adapted to engage the undersurface of a standard vehicle side sill, and means adapted to be supported alongside the vehicle for raising the outer end of said beam.

5. In a lifting jack, a beam adapted for insertion beneath and at right angles to one side of the vehicle, ground-engaging means at the inner end of said beam, said ground-engaging means providing for movement of said beam at right angles to the vehicle side, load-engaging means carried by an intermediate portion of said beam, an elongated member, means adapted to support said elongated member in a stationary and substantially upright position alongside the vehicle, a jack body carried by said upright member, means for elevating and lowering said jack body on said upright member, and a link connected at one end to said jack body and at the other end to the outer end of said beam.

6. The combination according to claim 5, said upright member comprising a rack bar the teeth of which face in a direction parallel to the vehicle side, a pawl mechanism carried by said jack body and engageable with said teeth, and handle means for operating said pawl mechanism, said handle means projecting from said jack body in a direction parallel to said vehicle side.

7. In a jack for automotive vehicles, a straight elongated beam adapted for insertion beneath one side of a vehicle at right angles thereto, an arcuate ground-engaging shoe pivoted to the inner end of said beam and providing for movement of the beam at right angles to the vehicle, a lifting pad pivotally mounted at an intermediate portion of said beam and adapted to engage the undersurface of a vehicle side sill, the distance between said lifting pad and said shoe being substantially less than the width of a vehicle, a rack bar, a base for supporting said rack bar in a stationary and substantially upright position alongside the vehicle, said base including means for offering substantial resistance to moment forces acting on said rack bar in a direction toward the vehicle, a jack body slidably mounted on said rack bar, a pawl mechanism carried by said jack body and operable to selectively raise or lower the jack body on the rack bar, handle means for operating said pawl mechanism and extending from said jack body in a direction parallel to the vehicle side, and a link pivotally connected between said jack body and the outer end of said beam.

References Cited in the file of this patent
UNITED STATES PATENTS

| | | |
|---|---|---|
| 815,757 | Stark | Mar. 20, 1906 |
| 867,549 | Bentley et al. | Oct. 1, 1907 |
| 2,400,235 | Johnson | May 14, 1946 |
| 2,494,099 | Mandelko et al. | Jan. 10, 1950 |
| 2,730,903 | Trautman et al. | Jan. 17, 1956 |